(12) United States Patent
Kim (10) Patent No.: US 8,823,766 B2
(45) Date of Patent: Sep. 2, 2014

(54) MOBILE TERMINAL AND METHOD FOR TRANSMITTING IMAGE THEREIN

(75) Inventor: Kyung Min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 12/243,581

(22) Filed: Oct. 1, 2008

(65) Prior Publication Data

US 2009/0109276 A1   Apr. 30, 2009

(30) Foreign Application Priority Data

Oct. 26, 2007  (KR) ......................... 10-2007-0108284

(51) Int. Cl.
   *H04N 7/14*      (2006.01)

(52) U.S. Cl.
   USPC ..................................... 348/14.07; 348/14.02

(58) Field of Classification Search
   CPC .............. H04N 1/00299; H04N 7/142; H04N 5/23232; H04N 5/272; H04N 21/4402; H04N 21/41407
   USPC ................................ 348/14.02, 14.07, 12.12
   See application file for complete search history.

(56) References Cited

U.S. PATENT DOCUMENTS

| | | | |
|---|---|---|---|
| 6,313,863 B1 | 11/2001 | Chida | |
| 8,049,678 B2 | 11/2011 | Lee et al. | |
| 2007/0057866 A1* | 3/2007 | Lee et al. | ........................ 345/1.1 |
| 2008/0084482 A1* | 4/2008 | Hansson et al. | ........... 348/218.1 |

FOREIGN PATENT DOCUMENTS

| | | |
|---|---|---|
| JP | 1996-046973 A | 2/1996 |
| JP | 2003-274376 A | 9/2003 |
| KR | 10-0672338 B1 | 1/2007 |
| KR | 10-2008-0082821 A | 9/2008 |

* cited by examiner

*Primary Examiner* — George Eng
*Assistant Examiner* — Nam Huynh
(74) *Attorney, Agent, or Firm* — Jefferson IP Law, LLP (57) ABSTRACT

A mobile terminal and a method for transmitting an image therein are provided. The method includes displaying a first image input through a first camera unit while participating in a video communication, transmitting the first image to a counterpart terminal, operating, if a second image is selected for transmission, a second camera unit, inputting a second image through the second camera unit, resizing the first image and the second image according to an image standard used for the video communication, displaying the resized first image and second image, and transmitting the resized first image and second image to the counterpart terminal. Thus, a user can view images for video communication input through more than one camera unit and transmit the images to a counterpart terminal during a video communication.

24 Claims, 4 Drawing Sheets

MOBILE TERMINAL AND METHOD FOR TRANSMITTING IMAGE THEREIN

PRIORITY

This application claims the benefit under 35 U.S.C. §119(a) of a Korean patent application filed in the Korean Intellectual Property Office on Oct. 26, 2007 and assigned Serial No. 2007-0108284, the entire disclosure of which is hereby incorporated by reference.

BACKGROUND OF THE INVENTION

1. Field of the Invention

The present invention relates to a mobile terminal and a method for transmitting an image therein. More particularly, the present invention relates to a mobile terminal having at least two camera units for video communication and a method for transmitting an image input through the camera units in the mobile terminal.

2. Description of the Related Art

A mobile terminal has various functions according to various user demands. The functions may include one or more of a communication function, a camera function, an MP3 function, a data transmitting function, a DMB function and the like.

A user can photograph a desired scene using a camera function in a mobile terminal as a moving picture or as a photograph instead of using a digital camera. Thus, a mobile terminal having a camera function has become popular.

Further, a user can perform video communication using the camera function and the communication function. The video communication enables users that are in communication to view each other and their environment.

A conventional mobile terminal for video communication includes two camera units. One camera unit is installed in a front part of the mobile terminal for photographing an image of a user to be transmitted to a person receiving a phone call. The other camera unit is installed at a rear part of the mobile terminal for taking a photograph or a moving picture.

In the conventional mobile terminal, while one camera unit is used for video communication including an image of the user, the other camera unit cannot be used. Accordingly, a user cannot take a photograph or a moving picture of their environment while engaging in video communication. Further, a user cannot share what happens nearby or a photograph that is previously stored with a person receiving the video communication.

SUMMARY OF THE INVENTION

An aspect of the present invention is to address at least the above-mentioned problems and/or disadvantages and to provide at least the advantages described below. Accordingly, an aspect of the present invention is to provide a mobile terminal having at least two camera units for video communication and a method for transmitting images input through the camera units in the mobile terminal.

In an exemplary embodiment of the present invention, a method for transmitting an image in a mobile terminal having at least two camera units is provided. The method includes displaying a first image input through a first camera unit while participating in a video communication, transmitting the first image to a counterpart terminal, operating, if a second image is selected for transmission, a second camera unit, inputting a second image through the second camera unit, resizing the first image and the second image according to an image standard used for the video communication, displaying the resized first image and second image, and transmitting the resized first image and second image to the counterpart terminal.

In another exemplary embodiment of the present invention, a method for transmitting an image in a mobile terminal having at least two camera units is provided. The method includes displaying a first image input through a first camera unit while participating in a video communication, transmitting the first image to a counterpart terminal, receiving a third image from the counterpart terminal, operating, if a second image is selected for transmission, a second camera unit, inputting a second image through the second camera unit, displaying at least one of the first image, the second image and the third image, and transmitting the first image and the second image to the counterpart terminal.

In a further exemplary embodiment of the present invention, a method for transmitting an image is provided. The method includes displaying a first image input through a first camera unit while participating in a video communication, transmitting the first image to a counterpart terminal, resizing, if a stored image is selected for transmission, at least one stored image and the first image, displaying the at least one stored image and the first image, and transmitting the first image and an image selected from the displayed at least one stored image.

In yet another exemplary embodiment of the present invention, a mobile terminal is provided. The terminal includes an input unit for inputting at least one of a video communication command and an image transmission command, a first camera unit for photographing a first image, a second camera unit for photographing a second image according to the at least one of a video communication command and an image transmission command input through the input unit, a controller for transmitting the first image according to the video communication command, and for resizing the first image and the second image according to an image standard used for video communication, for displaying the resized first image and second images, and for transmitting the resized first image and second image to a counterpart terminal according to the image transmission command, a display unit for displaying, under the control of the controller, the first image and the second image, and a wireless communication unit for transmitting, under the control of the controller, the resized first image and second image to the counterpart terminal.

In another exemplary embodiment of the present invention, a mobile terminal is provided. The terminal includes an input unit for inputting at least one of a video communication command and an image transmission command, a first camera unit for photographing a first image, a second camera unit for photographing a second image according to the at least one of a video communication command and an image transmission command input through the input unit, a controller for transmitting the first image according to the video communication command, for transmitting the first image and the second image to a counterpart terminal, and for receiving a third image from the counterpart terminal according to the image transmission command, a display unit for displaying at least one of the first, second and third images under the control of the controller, and a wireless communication unit for transmitting the first image and second image to the counterpart terminal under the control of the controller, and for receiving the third image from the counterpart terminal.

According to exemplary embodiments of the present invention, a user can use a plurality of camera units in a mobile terminal to effectively transmit a photograph or a moving picture photographed through a camera unit to a counterpart terminal during a video communication. In addition, the user can display an image input through a camera unit for the video communication and another image input through another camera unit during the video communication, thereby viewing the image for the video communication and the other image together.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions incorporated are omitted for clarity and conciseness.

In the exemplary embodiments of the present invention described hereinafter, an 'image' refers to all data input through a camera unit in a mobile terminal. The data may include at least one of a moving picture, a still photograph and the like.

Figure 1:
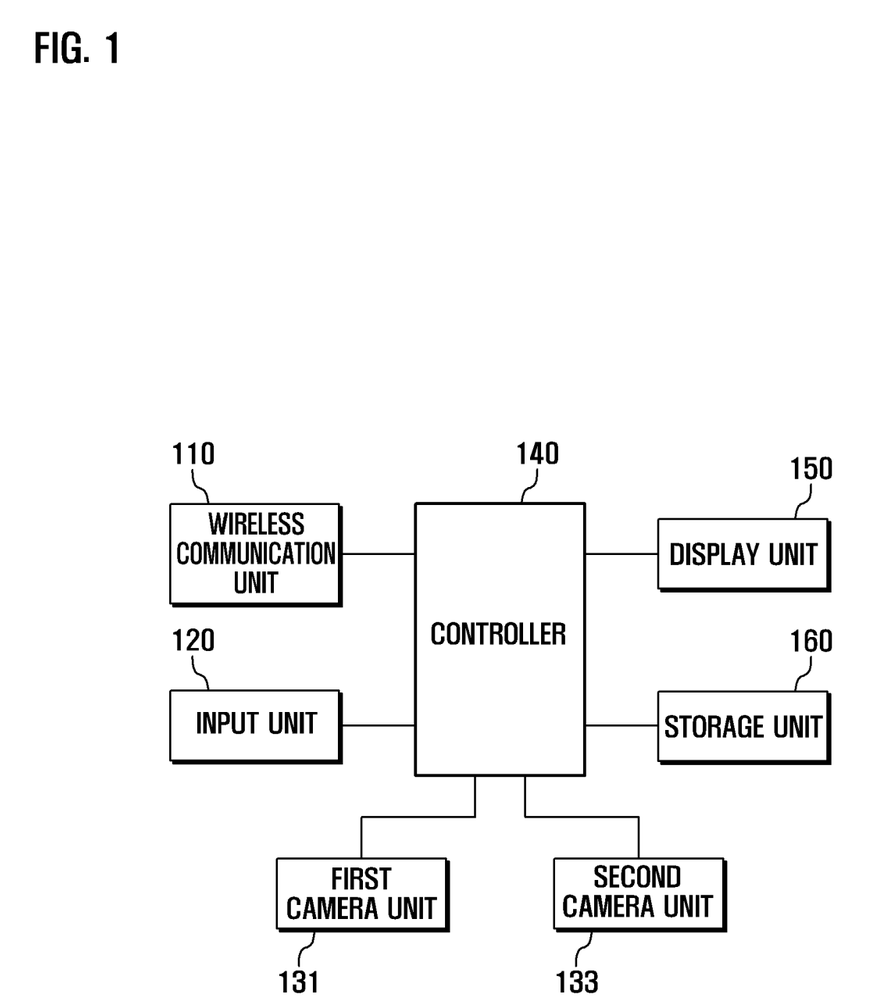
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a wireless communication unit 110, an input unit 120, a first camera unit 131, a second camera unit 133, a controller 140, a display unit 150 and a storage unit 160.

The wireless communication unit 110 performs a communication function between the mobile terminal and a base station. In addition, the wireless communication unit 110 may perform a communication function between the mobile terminal and another mobile terminal, a relay, or any other communications entity. The wireless communication unit 110 transmits and receives data for video communication and transmits and receives image data during video communication under the control of the controller 140. The wireless communication unit 110 may include at least one of a duplexer for separating a transmitting function and a receiving function, a transmitter for up-converting a frequency of a transmission signal, a receiver for down-converting a frequency of a received signal and the like.

The input unit 120 includes at least one of input keys for inputting characters, function keys for setting various functions and the like. The function keys may include at least one of a directional key, a side key, a shortcut key that are set to perform various functions and the like. In particular, the input unit 120 may include a video communication key for performing video communication and the like. The input unit 120 may also include at least one of a function key for taking a moving picture or a photograph (hereinafter, the moving picture and the photograph are referred to as an image) in video communication, a key for transmitting the photographed image to a counterpart terminal participating in the video communication and the like.

Although not shown, the first camera unit 131 and the second camera unit 133 may each include at least one of a camera sensor for converting an optical signal input through a lens into an analog image signal, a signal processor for converting the analog image signal processed from the camera sensor into digital data and the like. The camera sensor may be embodied as a Charged Coupled Device (CCD) sensor, and the signal processor may be embodied as a Digital Signal Processor (DSP). The first camera unit 131 and the second camera unit 133 each may photograph a user image to be transmitted to a counterpart terminal and may photograph an image of a surrounding environment in a video communication mode.

It is assumed that the first camera unit 131 photographs a user image for video communication to be transmitted to a counterpart terminal in video communication and the second camera unit 133 photographs an image of a surrounding environment. Hereinafter, the image input through the first camera unit 131 is referred to as a first image, and the image input through the second camera unit 133 is referred to as a second image. The mobile terminal having two camera units is exemplified in the present invention, however, more than two camera units may be provided according to a design of the mobile terminal.

The controller 140 may control overall operations of the mobile terminal. In particular, the controller 140 may control the wireless communication unit 110 to transmit the first image input through the first camera unit 131 to a counterpart terminal in the video communication mode. When a user selects an image transmission function through the input unit 120 during video communication, the controller 140 may control to display the second image input through the second camera unit 133 with the first image in the display unit 150. The controller 140 may control the wireless communication unit 110 to transmit the second image input through the second camera unit 133 with the first image input through the first camera unit 131 to the counterpart terminal.

Further, the controller 140 may resize the first and second images to be suitable for an image standard for video communication and may transmit the resized first and second images. For example, if a resolution format of the image standard for video communication may be a Quarter Common Intermediate Format (QCIF) resolution format, and the controller 140 may compress the first image into ¼ QCIF and may compress the second image into ½ QCIF, so that the first and second images are resized to be suitable for the image standard for video communication. The controller 140 may then resize resolution of a third image, which is an image of a user of a counterpart terminal participating in the video communication that is transmitted by the counterpart terminal to the mobile terminal, into ¼ QCIF and may display the first, second and third images in the display unit 150. When the controller 140 transmits the resized first and second images to the counterpart terminal, the controller 140 may transmit the first and second images as one image data or may transmit the first and second images as separate image data.

Figure 3:
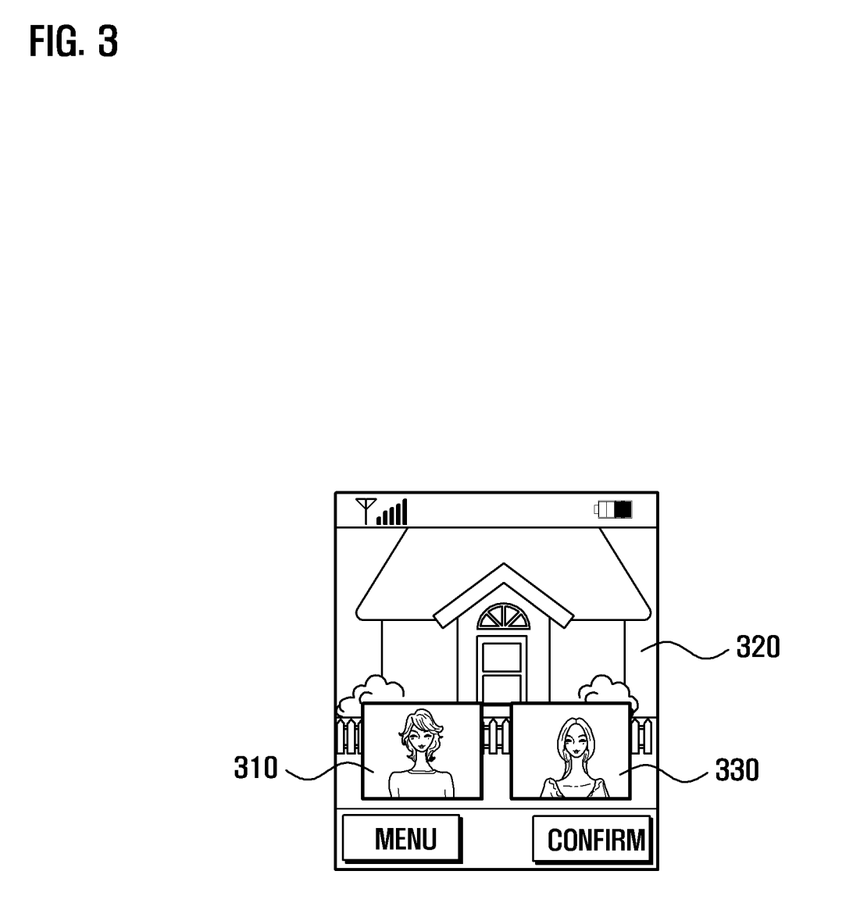
FIG. 3 is an example of a screen for displaying images during image transmission according to an exemplary embodiment of the present invention.

The display unit 150 displays information on operations of the mobile terminal. The display unit 150 may employ a Liquid Crystal Display (LCD), an Organic Light Emitting Diode (OLED) and the like. In this case, the display unit 150 may include an LCD controller, a memory unit for storing image data and an LCD display element. In a case that the LCD is embodied as a touch screen type, the display unit 150 may function as an input unit. As illustrated in FIG. 3 as an example, the display unit 150 may include a first screen 310, a second screen 320 and a third screen 330, and may display, respectively, the first image input through the first camera unit 131, the second image input through the second camera unit 133, and the third image received from the terminal of the counterpart person.

The storage unit 160 may store various programs for controlling operations of the mobile terminal and various data generated in the operations of the mobile terminal. The storage unit 160 may store the first and second images input through the first and second camera units 131 and 133 under the control of the controller 140. The storage unit 160 may store the third image transmitted from the counterpart terminal under the control of the controller 140. Further, the storage unit 160 may store an image, other than the third image, transmitted from the counterpart terminal under the control of the controller 140.

If an image transmission function is selected while in video communication, the controller 140 may transmit the first image input through the first camera unit 131 and the second image input through the second camera unit 133 to the counterpart terminal through the wireless communication unit 110. Here, the controller 140 may resize the first and second images to be suitable for the image standard for video communication. The controller 140 may also control the storage unit 160 to store the second image. If image transmission is selected in video communication, the controller 140 may transmit images stored in the storage unit 160 instead of the second image input through the second camera unit 133. When transmitting an image, the controller 140 may display the transmitted image with the first and third images in the display unit 150.

Hereinafter, a method for transmitting an image in a mobile terminal during video communication is described in detail with reference to FIG. 2.

Figure 2:
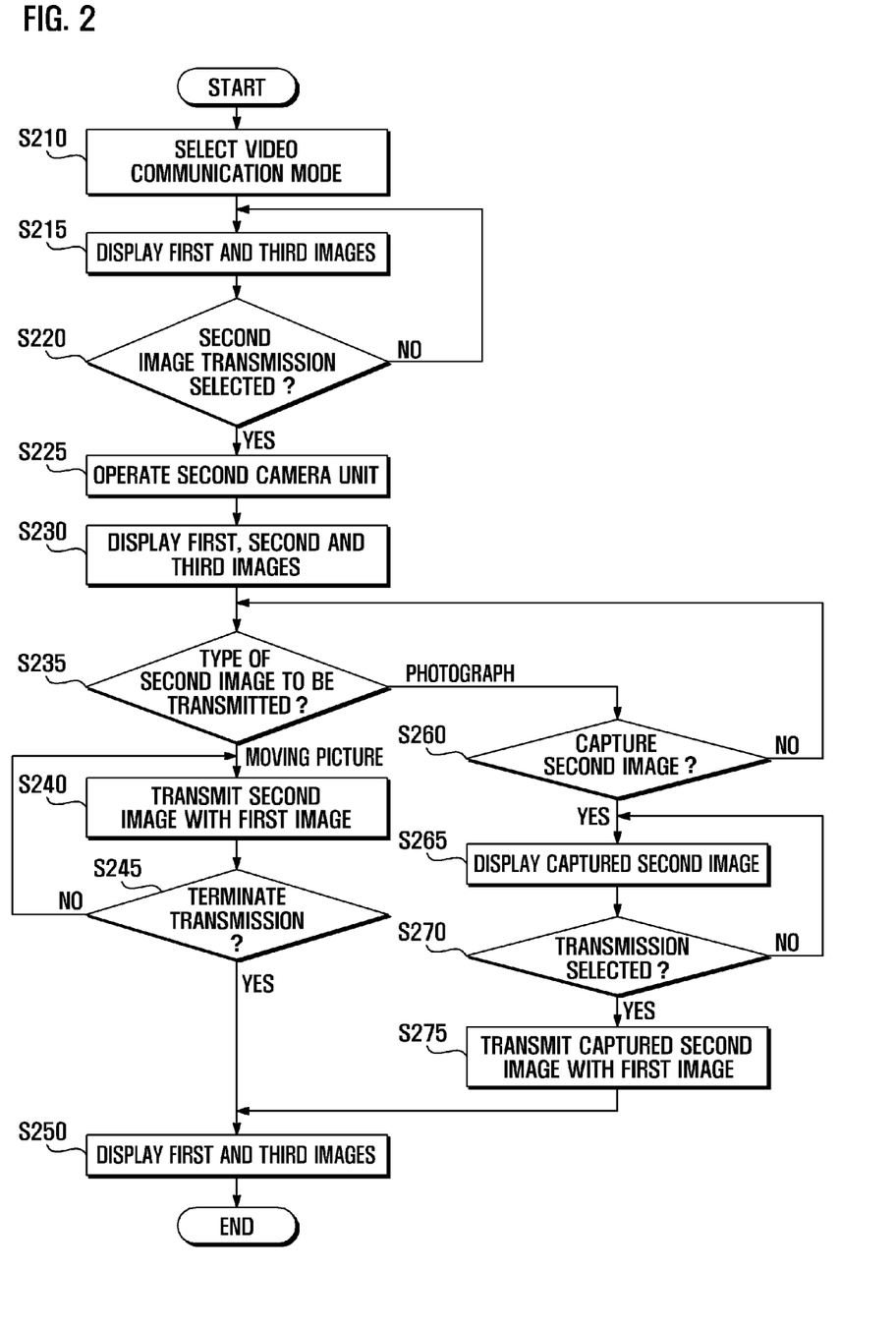
FIG. 2 is a flowchart illustrating a method for transmitting an image in a mobile terminal during video communication according to an exemplary embodiment of the present invention.

FIG. 2 is a flowchart illustrating a method for transmitting an image in a mobile terminal during video communication according to an exemplary embodiment of the present invention. FIG. 3 is an example of a screen for displaying images during image transmission according to an exemplary embodiment of the present invention.

Referring to FIG. 2, a user may input a phone number of a counterpart terminal to participate in a video communication through numeric keys in the input unit 120 and then may input the video communication key. The controller 140 may detect the key input as a video communication command and converts a mode of the mobile terminal into a video communication mode in step S210. Alternatively, a request for participation in the video communication may be received through the wireless communication unit 110 and may be accepted, such as by an input from the user through the input unit 120 and the like. Next, the controller 140 may control the wireless communication unit 110 to perform video communication with the counterpart terminal in step S215. The controller 140 may operate the first camera unit 131 to display a first image input through the first camera unit 131 in the display unit 150. During video communication, the controller 140 may transmit the first image input through the first camera unit 131 to the counterpart terminal through the wireless communication unit 110.

The controller 140 may display the first image transmitted to the counterpart terminal on the first screen 310 of the display unit 150 and may display the third image of the user of the counterpart terminal received from the counterpart terminal on the third screen 330 of the display unit 150. The sizes and positions of the desired first and third images may differ according to user or other settings. Further, the controller 140 may resize the first image and the third image to be suitable for the set size of the screen for display.

Then, the controller 140 may determine whether second image transmission is selected in step S220. The user may select, during video communication, second image transmission through at least one of a function key, a menu in the input unit 120 and the like. If the user does not select second image transmission, the process returns to step S215. If the user selects second image transmission, the controller 140 may operate the second camera unit 133 in step S225.

The controller 140 may display the second image input through the second camera unit 133 in step S230. The controller 140 may control the display unit 150 to display the second image on the second screen 320 while displaying the first image on the first screen 310 and the third image on the third screen 330.

The first, second and third images can be displayed on a screen that is divided into the first, second and third screens 310 to 330, as illustrated in FIG. 3. Referring to FIG. 3, the first image is displayed on the first screen 310, the second image on the second screen 320 and the third image on the third screen 330. Further, according to a screen dividing method, image allocation to the divided screens and the sizes and positions of the screens may vary according to at least one of user settings, manufacture settings and the like. The images to be displayed on the three screens may be exchanged with each other according to a user selection. Further, if the second screen 320 is a main screen and the first and third screens 310 and 330 are sub-screens, as illustrated in FIG. 3, the image displayed on the main screen may be exchanged with any one of the images displayed on the sub-screens by the user's selection. For example, if a user selects the first screen 310 using at least one of a directional key, a touch on a touch screen, a menu and the like, and then selects the second screen 320, the controller 140 may control to replace the first image displayed on the first screen 310 with the second image, and to replace the second image displayed on the second screen 320 with the first image. Similarly, the controller 140 may control to display any one of the images displayed on the other screens on the third screen 330 in place of the third image according to the user's selection.

The controller 140 may resize the first, second and third images to be suitable for the image standard for video communication. For example, the controller 140 may resize the first image into ¼ QCIF, the second image into ½ QCIF, and the third image into ¼ QCIF, so that the first, second and third images are displayed together.

Then, the controller 140 may determine the type of the second image to be transmitted in step S235. That is, the controller 140 may determine whether the type of the second image to be transmitted is a moving picture or a photograph. If the moving picture is selected, the controller 140 may transmit the second image, that is, a moving picture input through the second camera unit 133, with the first image to the counterpart terminal in step S240. Here, the controller 140 may control the sizes of the first and second images to be suitable for the image standard for video communication to the counterpart terminal. Accordingly, the user can take a moving picture of their environment or of a nearby incident through the second camera unit 133 in the mobile terminal as a second image. The second image can be transmitted to the counterpart terminal in real time.

The controller 140 may determine whether transmission of the second image is to be terminated in step S245. If the user inputs a function key, for example a confirmation key, in the input unit 120 to terminate the second image photographing, the controller 140 may detect the key input as an instruction to terminate moving picture transmission. The controller 140 may then delete the second screen 320 on which the second image is displayed, and may display only the first and third screens 310 and 330 on which the first and third images are displayed in step S250. The controller 140 may store the transmitted second image in the storage unit 160 according to at least one of the user's selection, a setting and the like.

If the user selects photograph transmission at step S235, the controller 140 may determine whether the user inputs a photographing key in the input unit 120 to capture the second image as a photograph in step S260. If the user does not input a photographing key in the input unit 120, the process returns to step S235. If the user inputs a photographing key in the input unit 120, the controller 140 may capture the second image as a photograph and may display the captured second image on the second screen 320 of the display unit 150 in step S265. The controller 140 may control the display unit 150 to continue displaying the first screen 310 and the third screen 330 on which the first and third images are displayed with the second screen 320.

Next, the controller 140 may determine whether transmission of the captured image is selected in step S270. The user may select the captured image transmission through at least one of a function key, a menu and the like in the input unit 120. If transmission of the captured image is not selected, the process returns to step S265. If transmission of the captured image is selected, the controller 140 may transmit the captured second image with the first image to the counterpart terminal in step S275. The controller 140 may resize the first and second images to be suitable for the image standard for video communication for transmission. The controller 140 may store the captured second image in the storage unit 160 according to at least one of the user's selection, a setting and the like.

After transmission of the captured second image, the controller 140 may delete the second screen 320 on which the second image is displayed and may display the first and third screens 310 and 330 on which the first and third images are displayed in step S250.

Figure 4:
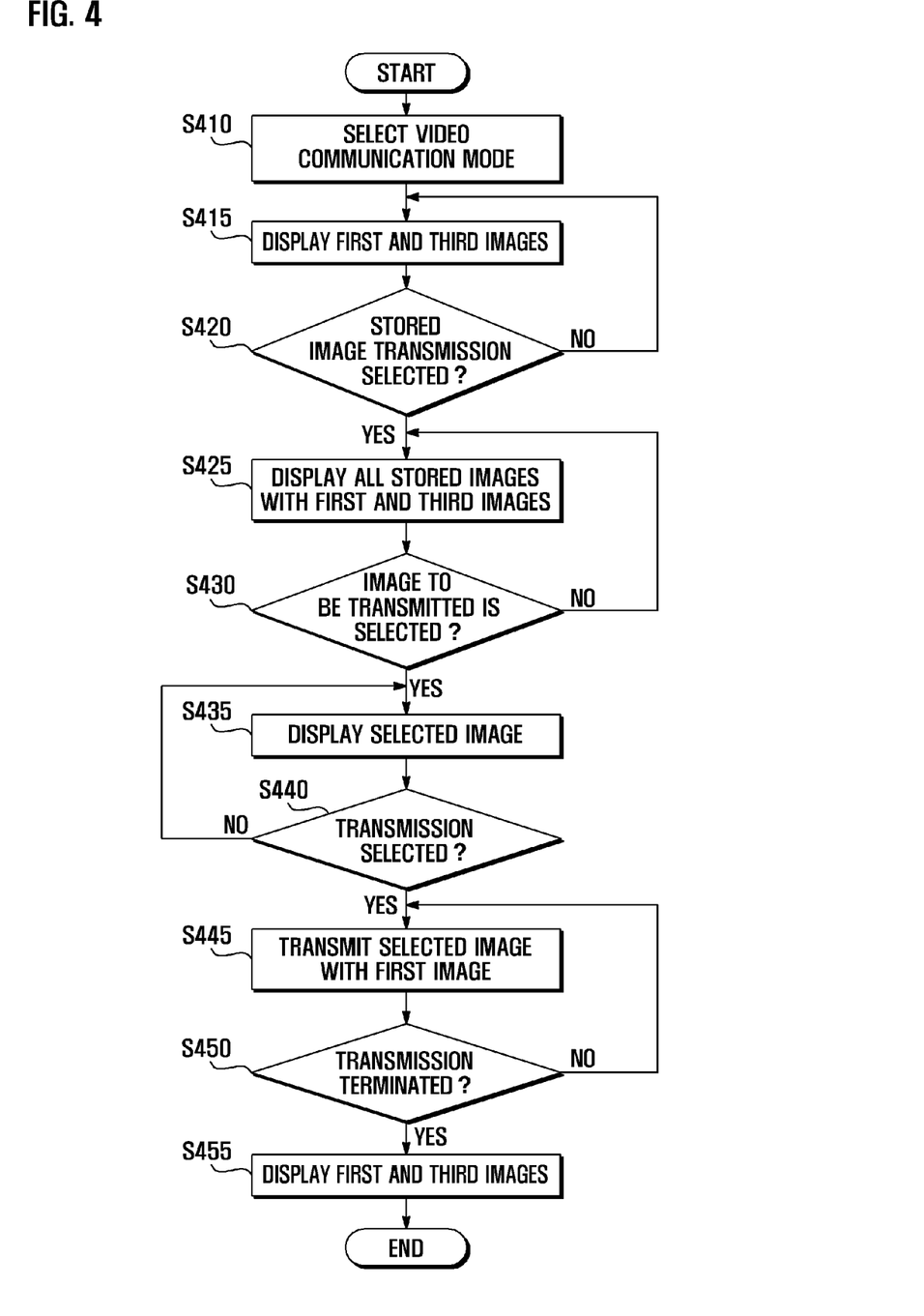
FIG. 4 is a flowchart illustrating a method for transmitting a stored image during video communication according to an exemplary embodiment of the present invention.

Hereinafter, a method for displaying an image stored in a mobile terminal in video communication and for transmitting the displayed image to a counterpart terminal is described in detail.

FIG. 4 is a flowchart illustrating a method for transmitting a stored image during video communication according to an exemplary embodiment of the present invention.

Referring to FIG. 4, a user may input a phone number of a counterpart terminal to participate in a video communication through numeric keys in the input unit 120 and then may input a video communication key. The controller 140 may detect the key input as a video communication command and may convert a mode of the mobile terminal into a video communication mode in step S410. Alternatively, a request for participation in the video communication may be received through the wireless communication unit 110 and may be accepted, such as by an input from the user through the input unit 120 and the like. Next, the controller 140 may control the wireless communication unit 110 to perform video communication with the counterpart terminal in step S415. The controller 140 may operate the first camera unit 131 to display a first image input through the first camera unit 131 in the display unit 150. During video communication, the controller 140 may transmit the first image input through the first camera unit 131 to the counterpart terminal through the wireless communication unit 110.

The controller 140 may display the first image transmitted to the counterpart terminal on the first screen 310 of the display unit 150 and may display the third image of the user of the counterpart terminal received from the counterpart terminal on the third screen 330 of the display unit 150. The sizes and positions of the displayed first and third images may differ according to user or other settings.

Next, the controller 140 may determine whether stored image transmission is selected in step S420. The user may select, during video communication, the stored image transmission through at least one of a function key, a menu in the input unit 120 and the like. If the user does not select stored image transmission, the process returns to step S415. If the user selects the stored image transmission, the controller 140 may display all images stored in the storage unit 160 on the second screen 320 in step S425. The stored images may be displayed in at least one of a moving sequence manner, as thumbnail images on the second screen 320 and the like. The controller 140 may control the display unit 150 to display the stored images on the second screen 320 while displaying the first image on the first screen 310 and the third image on the third screen 330.

The controller 140 may determine whether the user selects an image to be transmitted from the displayed stored images through the input unit 120 in step S430. If the user does not select an image to be transmitted, the process returns to step S425. If the user selects an image to be transmitted, the controller 140 may display the selected image on the second screen 320 in step S435. Next, the controller 140 may determine whether transmission of the selected image is selected in step S440. If the user does not select image transmission, the process returns to step S435. If the user selects image transmission, the controller 140 may transmit the selected image with the first image to the counterpart terminal in step S445. The controller 140 may determine the sizes of the first image and the selected image and may resize the first image and the selected image to be suitable for video communication for transmission.

The controller 140 may determines whether the image transmission is to be terminated in step S450. When the transmission is terminated, the controller 140 may delete the second screen 320 on which the selected image is displayed, and may display only the first and third screens 310 and 330 on which the first and third images are displayed in step S455. If the transmission is not terminated, the process returns to step S445.

Although not shown, if an image is received from a counterpart terminal in addition to the third image of the user of the counterpart terminal participating in the video communication, the controller 140 may display the additional received image in the display unit 150 together with the third image.

That is, the controller 140 may display the first image input through the first camera unit 131 and transmitted to the counterpart terminal on the first screen 130, the additional image received from the counterpart terminal on the second screen 320, and the third image of the user of the counterpart terminal on the third screen 330. The controller 140 may resize the images displayed on the first screen 310, second screen 320 and third screen 330 to be suitable for the image standard for video communication.

Further, in a case the mobile terminal and the counterpart terminal transmit and receive images at the same time in video communication, the controller 140 may divide the screen of the display unit 150 into four screen areas and may display the image received from the counterpart terminal and the image transmitted from the mobile terminal, in addition to the images of the user of the mobile terminal and the user of the counterpart terminal, in the four screen areas.

While the present invention has been described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for transmitting an image in a mobile terminal having at least two camera units, the method comprising:
    operating a first camera unit for capturing a first image;
    receiving a counterpart image from a counterpart terminal;
    displaying the first image and the counterpart image on a screen;
    operating a second camera unit for capturing a second image with a higher resolution format than the first image while the first camera unit is operating;
    displaying the first image, and the second image, and the counterpart image on the screen;
    determining whether a type of the second image to be transmitted is a moving picture or a photograph;
    transmitting the first image with the second image to the counterpart terminal if the second image is a moving picture; and
    terminating transmission of the second image if a user input for terminating transmission of the second image is received.

2. The method according to claim 1, further comprising:
    selecting a type of the second image; and
    transmitting the first image and the second image according to the selected type of the second image.

3. The method according to claim 2, wherein the selected type of the second image comprises one of a moving picture and a photograph.

4. The method according to claim 3, further comprising:
    capturing and displaying, if the selected type of the second image comprises the photograph, the second image,
    wherein the transmitting of the first image and the second image to the counterpart terminal comprises transmitting the first image and the captured second image.

5. The method according to claim 1, further comprising:
    determining sizes of the first and second images to be displayed on the screen based on a number of camera units operating;
    resizing the first and second images into the determined sizes of the first and second images according to an image standard used for video communication, wherein the image standard varies depending on the sizes of the first and second images displayed on the screen; and
    displaying the resized first and second images and the counterpart image on the screen,
    wherein the displaying of the resized first and second images and the counterpart image comprises displaying the first image on a first screen, the second image on a second screen, and the counterpart image on a third screen.

6. The method according to claim 5, wherein the transmitting the first image with the second image to the counterpart terminal comprises:
    transmitting the resized first image and the resized second image to the counterpart terminal.

7. The method according to claim 5, wherein the resizing of the first image for the video communication comprises differently resizing with the first image in at least one of size and resolution format.

8. The method according to claim 5, wherein the resizing of the first image comprises identically resizing at least one of size and resolution format of the resized second image.

9. A method for transmitting an image in a mobile terminal having at least two camera units, the method comprising:
    operating a first camera unit for capturing a first image;
    receiving a third image from a counterpart terminal;
    determining a size of the first image received through the first camera unit when the first camera unit is operating;
    resizing the first image into the determined size according to the image standard used for video communication;
    transmitting the resized first image to the counterpart terminal;
    displaying the first image and the third image on a screen;
    operating a second camera unit for capturing a second image with a higher resolution format than the first image while the first camera unit is operating;
    displaying the first image, second image, and third image;
    determining whether a type of the second image to be transmitted is a moving picture or a photograph;
    transmitting the resized first image with the second image to the counterpart terminal if the second image is a moving picture; and
    terminating transmission of the second image if a user input for terminating transmission of the second image is received.

10. The method according to claim 9, wherein each of the first, second and third images comprises one of a moving picture and a photograph.

11. The method according to claim 9, further comprising:
    determining sizes of the first and second images to be displayed on the screen based on a number of camera units operating;
    resizing the first and second images into the determined sizes of the first and second images according to an image standard used for the video communication, wherein the image standard varies depending on the sizes of the images displayed on the screen; and
    displaying the resized first and second images and third image,
    wherein the displaying of the resized first and second images and third image on a screen comprises displaying one of the first image, the second image and the third image on a main screen and displaying any remaining images on sub-screens,
    wherein the transmitting the resized first image with the second image to the counterpart terminal comprises transmitting the resized first and second images to the counterpart terminal.

12. The method according to claim 11, wherein the image displayed on the main screen and any images displayed on the sub-screens are exchangeable according to a selection by a user.

13. A method for transmitting an image, the method comprising:
operating a first camera unit for capturing a first image;
determining a size of the first image received through the first camera unit when the first camera unit is operating;
resizing the first image to the determined size according to an image standard used for video communication;
transmitting the resized first image to a counterpart terminal;
selecting at least one stored image while the first camera unit is operating; and
displaying the first image and the selected image;
determining whether a type of the selected image to be transmitted is a moving picture or a photograph;
transmitting the resized first image with the selected image to the counterpart terminal if the selected image is a moving picture; and
terminating transmission of the selected image if a user input for terminating transmission of the selected image is received.

14. The method according to claim 13, wherein the image comprises one of a moving picture and a photograph.

15. The method according to claim 13, further comprising:
determining sizes of the first image and the selected image to be displayed on a screen;
resizing the first image and the selected image into the determined sizes of the first image and the selected image according to the image standard used for video communication, wherein the image standard varies depending on the sizes of the images displayed on the screen;
displaying the resized first image and selected image; and
displaying a third image received from the counterpart terminal.

16. A mobile terminal, the terminal comprising:
an input unit for inputting at least one of a video communication command and an image transmission command;
a first camera unit configured to capture a first image;
a second camera unit configured to capture a second image with a higher resolution format than the first image according to the at least one of a video communication command and an image transmission command input through the input unit;
a controller configured to determine whether a type of the second image to be transmitted is a moving picture or a photograph, to transmit the first image with the second image to the counterpart terminal if the second image is a moving picture, and to terminate transmission of the second image if a user input for terminating transmission of the second image is received;
a display unit configured to display, under the control of the controller, the first image and the second image; and
a wireless communication unit configured to transmit, under the control of the controller, the first image with the second image to the counterpart terminal.

17. The terminal according to claim 16, wherein the display unit comprises a first screen configured to display the first image, a second screen configured to display the second image, and a third screen configured to display a counterpart image for video communication received from the counterpart terminal.

18. The terminal according to claim 17, wherein the controller is further configured to determine sizes of the first and second images to be displayed on a screen based on a number of camera units operating, to resize the first image and the second image into the determined sizes of the first and second images according to an image standard used for video communication, wherein the video standard varies depending on the sizes of the of the images displayed on the screen, and for transmitting the resized first image and second image to a counterpart terminal according to the image transmission command,
wherein the controller resizes the first image to ¼ Quarter Common Intermediate Format (QCIF), resizes the second image to ½ QCIF, and resizes the counterpart image to ¼ QCIF.

19. The terminal according to claim 17, wherein each of the first, second and counterpart images comprises one of a moving picture and a photograph.

20. The terminal according to claim 17, wherein the first image comprises a user image for video communication input through the first camera unit, the second image comprises an image of a surrounding environment input through the second camera unit, and the counterpart image comprises an image received from the counterpart terminal of the counterpart terminal's user.

21. The terminal according to claim 16, wherein the controller is further configured to transmit the first image and the second image as one image.

22. The terminal according to claim 16, wherein the controller is further configured to transmit the first image and the second image as separate images.

23. The terminal according to claim 16, wherein the controller is further configured to display one of the first image, the second image and the counterpart image on a main screen, and to display any remaining images on sub-screens.

24. The terminal according to claim 23, wherein the image displayed on the main screen and any images displayed on the sub-screens are exchangeable according to a selection by a user.

* * * * *